UNITED STATES PATENT OFFICE.

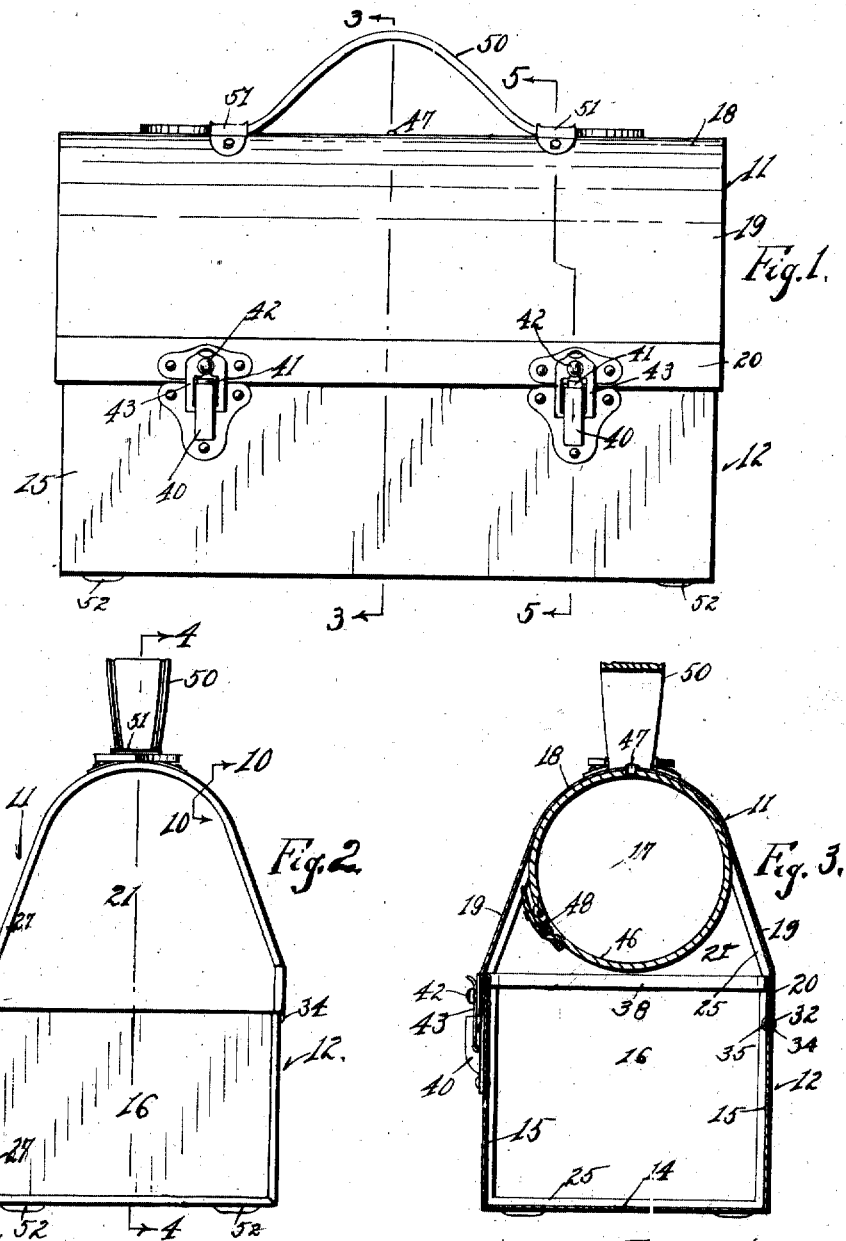

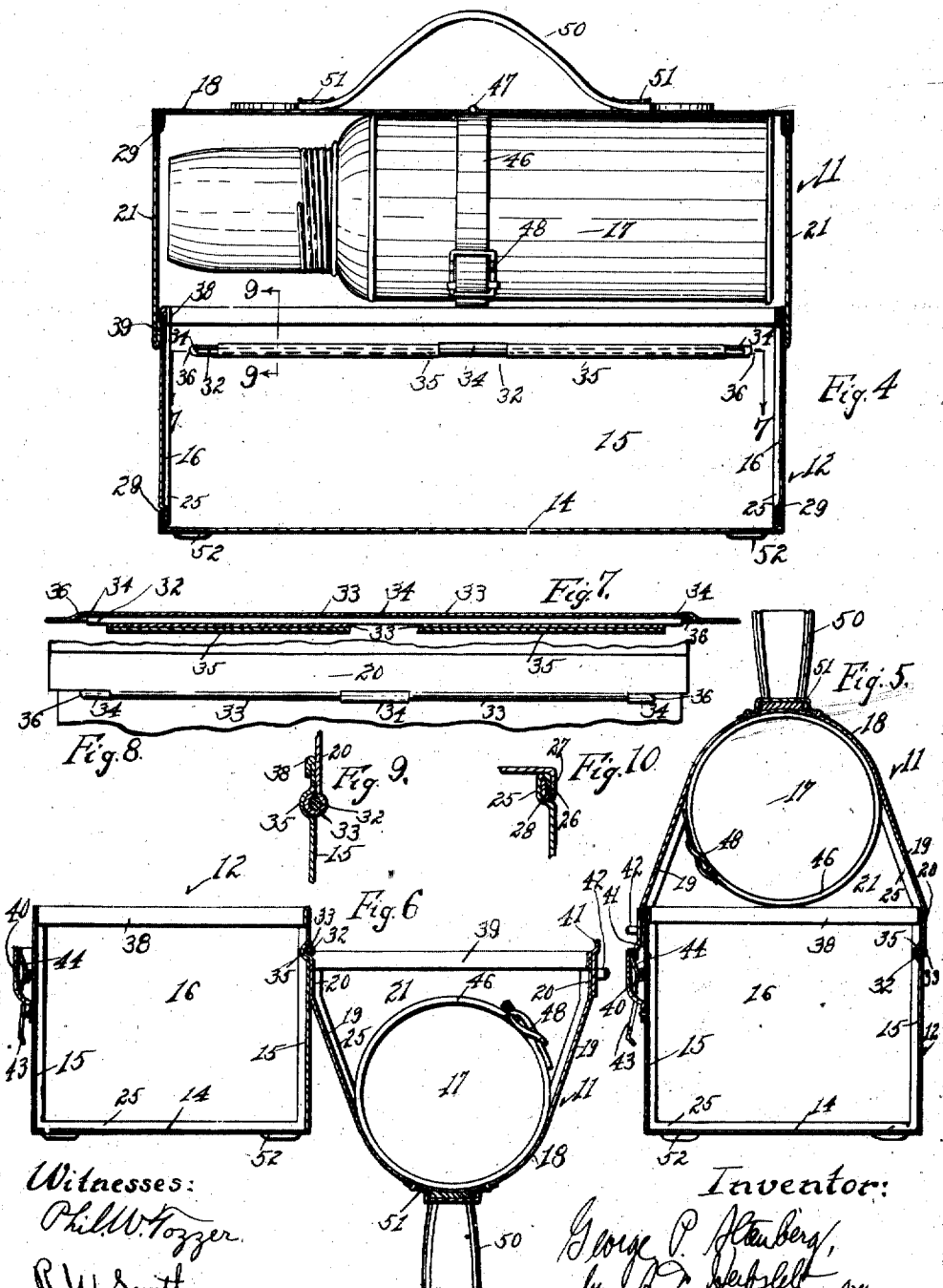

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

LUNCH KIT.

1,276,852.  Specification of Letters Patent.  Patented Aug. 27, 1918.

Application filed March 9, 1917. Serial No. 153,736.

*To all whom it may concern:*

Be it known that I, GEORGE P. ALTENBERG, a citizen of the United States, residing at Cincinnati, in the county of Hamilton and State of Ohio, have invented certain new and useful Improvements in Lunch Kits, of which the following is a specification.

My invention relates to lunch kits intended primarily for carrying lunches by workmen or school childr'n and for use in other relations, and so arranged as to contain edibles in the body of the kit and a so-called vacuum bottle in the top of the kit.

It is the object of my invention to provide a lunch kit which will be strongly constructed and durable and in which the top is hinged to the body by means of a hinge which has substantially integral connection with both the top and the body, and provided with releasable securing means for forming a substantially secure connection between the separating sides of the top and body when the kit is closed.

My invention consists further in so connecting the walls of the top and of the body of the kit, and so relating the same, as to form a strong and economical structure.

The invention will be further readily understood from the following description and claim, and from the drawings, in which latter:

Figure 1 is a front elevation of a lunch kit constructed in accordance with my invention.

Fig. 2 is an end view of the same.

Fig. 3 is a vertical section on the line 3—3 of Fig. 1.

Fig. 4 is a vertical longitudinal section on the line 4—4 of Fig. 2, showing a so-called vacuum bottle in the top of the kit.

Fig. 5 is a vertical section on the line 5—5 of Fig. 1.

Fig. 6 is a similar view showing the top of the kit in open position.

Fig. 7 is a horizontal section on the line 7—7 of Fig. 4.

Fig. 8 is a fragmentary rear elevation of a lunch kit, showing the hinge connection between the top and the body of the kit.

Fig. 9 is a detail vertical section on the line 9—9 of Fig. 4; and,

Fig. 10 is an enlarged section on the line 10—10 of Fig. 2, showing the method of connecting the walls of the top and of the body of the kit.

11 represents the top of the lunch kit and 12 the body thereof, to which the top is hinged so as to form a closed receptacle, the top and body being preferably formed of sheet metal.

The body is exemplified as of rectangular construction, comprising a bottom 14 and side-walls 15 formed integral therewith. End-walls 16 are formed between the side-walls and the bottom at each end thereof, the connection between the end-walls and the bottom and side-walls preferably comprising a lap-joint. The top of the kit, which is adapted to contain a so-called vacuum bottle such as shown at 17, is exemplified as comprising a curved crown 18 conforming to the contour of the bottle 17, and side-walls 19 slanting downwardly and outwardly therefrom, and terminating in parallel flanges 20 adapted to fit over the upper edges of the side-walls of the body of the kit. The ends of the top thus formed, are instanced as closed by end-walls 21, preferably connected by lap-joints to the crown and side-walls of the top.

The lap-joint connection between the walls, is exemplified as formed by providing an off-set portion 25 upon each of the joint-forming edges of end-walls 16 and 21, the offset portions each terminating in a reversely bent lip 26. The walls of the kit adapted to be respectively connected to the end-walls 16 and 21, each extend past the connecting end-wall, to form a lip 27 adapted to be bent over the proximate coöperating lip 26 upon the end-wall, the lip 27 lying in substantially longitudinal alinement with the end-wall to which it is thus connected, and the end of lip 27 being reversely bent as shown at 28, so as to be received between lip 26 and the offset portion 25 of the end-wall, thus forming a rigid joint, the said joint being located within the recess 29 at the outer marginal edges of said end-walls 16 and 21.

The top of the kit as thus constructed, is adapted to be hinged to one of the side-walls of the body, the hinge connection being preferably so arranged that when the top is closed, it will extend over the upper edge of the body a distance substantially equal to the width of flanges 20 of the top. The hinge connection is instanced as comprising an elongated pin 32 adapted to be received in knuckles 33 which are preferably two in number, formed integral with and projecting in longitudinal spaced relation below the lower edge of one of the flanges 20 of the top of the kit, the knuckles each extending integrally throughout substantially one-half the length of the hinge, for providing great strength and resistance to torsion in the hinge.

The pin 32 is rotatably supported intermediate of knuckles 33 and beyond the ends thereof, in coöperating bearings formed in one of the side-walls of the body of the kit a suitable distance below the upper edge thereof.

The bearings in side-wall 15 for pin 32, are exemplified as comprising outwardly curved longitudinally alined bearing-brackets 34 stamped from wall 15, the brackets being spaced from each other by inwardly curved, similarly alined grooves 35 which are also stamped in wall 15. Grooves 35 are adapted to receive knuckles 33 of the top, and bearing-brackets 34 and knuckles 33 are so arranged relative to each other, as to jointly form continuous longitudinally alined bearings for pin 32, the brackets 34 at the ends of the pin forming retaining walls 36 for retaining the pin within its bearings. A hinged connection is thus formed between the top and body of the kit, in which the hinge has substantially integral connection with both top and body, and whereby the top will extend over the edge of the body a substantial distance when closed.

The pivotal axis of the hinge thus formed is in the plane of the outer face of the wall of the body in which the same is located, so that when the top is closed the inner face of the flange 20 from which the hinge depends, will impinge against the outer face of the side-wall of the body above the hinge, and when the lid is open, the outer face of flange 20 will lie against the outer face of the side-wall of the body below the hinge, thus affording support between the flange of the top and the body throughout a substantial area proximate to the hinge whether the top be open or closed.

The upper edge of the body and the lower edge of the top are each reversely bent inwardly against the walls of said body and top respectively, as shown by the reversely bent edges 38, 39, (see Fig. 4), which are in such position with relation to the hinge that, when the top is closed, the reversely bent edges 39 will substantially pass the horizontal plane in which the reversely bent edges 38 are located, and both the reversely bent edges 38 and 39 will be located above the pivotal axis of the hinge, affording an exceptionally strong structure, the proximate margins of the said edges only overlapping, thus saving metal.

The overlapping separating sides of the top and body are exemplified as provided with releasable securing means, instanced as comprising elongated socket-members 40 secured to the side-wall of the body, in which are adapted to be received coöperating tongue-members 41, secured to the overlapping flange 20 of the top. Each tongue-member is preferably provided with a rigid head 42, over which a fastening-yoke 43 is adapted to be removably received, the fastening-yoke 43 being pivotally mounted upon socket-member 40, and adapted to be releasably held in operative or in inoperative position in a well-known manner, as by a spring-finger 44 within the socket-member abutting against the yoke.

The parts of the kit are so designed and arranged, that edibles may be contained within the body of the kit, and a so-called vacuum bottle may be secured within the top, the securing means for the bottle being instanced as comprising a strap 46, preferably fastened intermediate of its ends, to the under-side of the crown of the top, as by rivet 47, the strap ends being provided with fastening means, instanced as a buckle 48 of suitable construction.

A handle is preferably provided upon the top of the kit, exemplified as a standard strap handle 50, having it ends received beneath retaining strips 51, preferably riveted to the crown of the top, and the base of the kit is exemplified as protected from contact with a surface upon which it may be placed, as by projecting knobs 52 formed upon the under-side of the bottom of the kit body.

Having thus fully described my invention, what I claim as new and desire to secure by Letters Patent, is:

In a lunch kit, the combination of a top having an upper crown portion formed as the sector of a cylinder extending longitudinally of said top, outwardly slanting sides merging into said crown portion, a body, a carrying strap, a hinge extending substantially throughout the length of said top and body at one of the sides of said top and body, a plurality of releasable clasping means between the end portions of said top and body at the other side of said top and body, and a plurality of supporting means at the end portions of said crown portion for said carrying strap, whereby the support for the carrying strap is substantially in cross line with said hinge and respective releasable clasping means.

In testimony whereof, I have hereunto signed my name in the presence of two subscribing witnesses.

GEORGE P. ALTENBERG.

Witnesses:
M. F. HAWKINS,
DAWSON E. BRADLEY.